United States Patent
Weeks et al.

(10) Patent No.: US 6,704,413 B1
(45) Date of Patent: Mar. 9, 2004

(54) AUDITORY USER INTERFACE

(75) Inventors: William A. Weeks, Santa Cruz, CA (US); Bruce E. Balentine, Denton, TX (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 09/427,382

(22) Filed: Oct. 25, 1999

(51) Int. Cl.$^7$ ................................................ H04M 1/00
(52) U.S. Cl. .................................. 379/374.01; 379/419
(58) Field of Search ........................... 379/354, 355.01, 379/355.02, 355.03, 355.04, 355.06, 355.07, 373.01, 374.01, 374.03, 373.02, 373.03, 373.05, 374.02, 375.01, 433.06, 433.07, 420.02, 420.03, 420.04, 421; 455/418, 414, 425, 566, 567, 556, 558, 575

(56) References Cited

U.S. PATENT DOCUMENTS

| | | | | |
|---|---|---|---|---|
| 5,247,565 A | * | 9/1993 | Joglekar et al. | 379/355.01 |
| 5,606,597 A | * | 2/1997 | Newland | 379/355 |
| 5,826,064 A | | 10/1998 | Loring et al. | 395/500 |
| 6,473,628 B1 | * | 10/2002 | Kuno et al. | 455/566 |

OTHER PUBLICATIONS

Balentine, B., "How to Build a Speech Recognition Application, A Style Guide for Telephony Dialogues," Enterprise Integration Group, pp. 125–140, Apr., 1999.

Brewster, S. A., Wright, P. C., and Edwards, A. D. N., "A Detailed Investigation into the Effectiveness of Earcons," HCI Group, Department of Computer Science, University of York Heslongton, pp. 1–17.

Brewster, S. A., Wright, P. C., and Edwards, A. D. N., "An Evaluation of Earcons for Use in Auditory Human–Computer Interfaces," Department of Computer Science, University of York Heslongton, pp. 1–6.

Brewster, S. A., Wright, P. C., and Edwards, A. D. N., "Guidelines for the Creation of Earcons," Glasgow Interactive Systems Group, Multimodal Interaction Group pp. 1–6, http://www.dcs.gla.ac.uk/~stephen/earcon_guidelines.shtml.

Brewster, S., Capriotti, A., and Hall C., "Using Compound Earcons to Represent Hierarchies," Glasgow Interactive Systems Group, Department of Computing Science, University of Glasgow, pp. 1–2, http://www.dcs.gla.ac.uk/~stephen/.

Leplâtre, G., and Brewster, A., "Perspectives on the Design of Musical Auditory Interfaces," Department of Computing Science, University of Glasgow, pp. 1–15, http://www.dsc.gla.ac.uk/~{gregory,stephen}.

* cited by examiner

*Primary Examiner*—Rexford Barnie
(74) *Attorney, Agent, or Firm*—Peter Hsieh

(57) ABSTRACT

An auditory user interface provides auditory feedback concerning variable parameters of a device. Auditory user interface elements indicate modes corresponding to control functions and variable parameters. Additional auditory user interface elements indicate particular values for the parameters. Each control function is distinguished by particular auditory characteristics, such as distinct musical scales, so that the user can easily recognize which mode is active and discern the current value for the parameter corresponding to the mode. Center values and limit values are denoted by distinctive auditory elements.

49 Claims, 11 Drawing Sheets

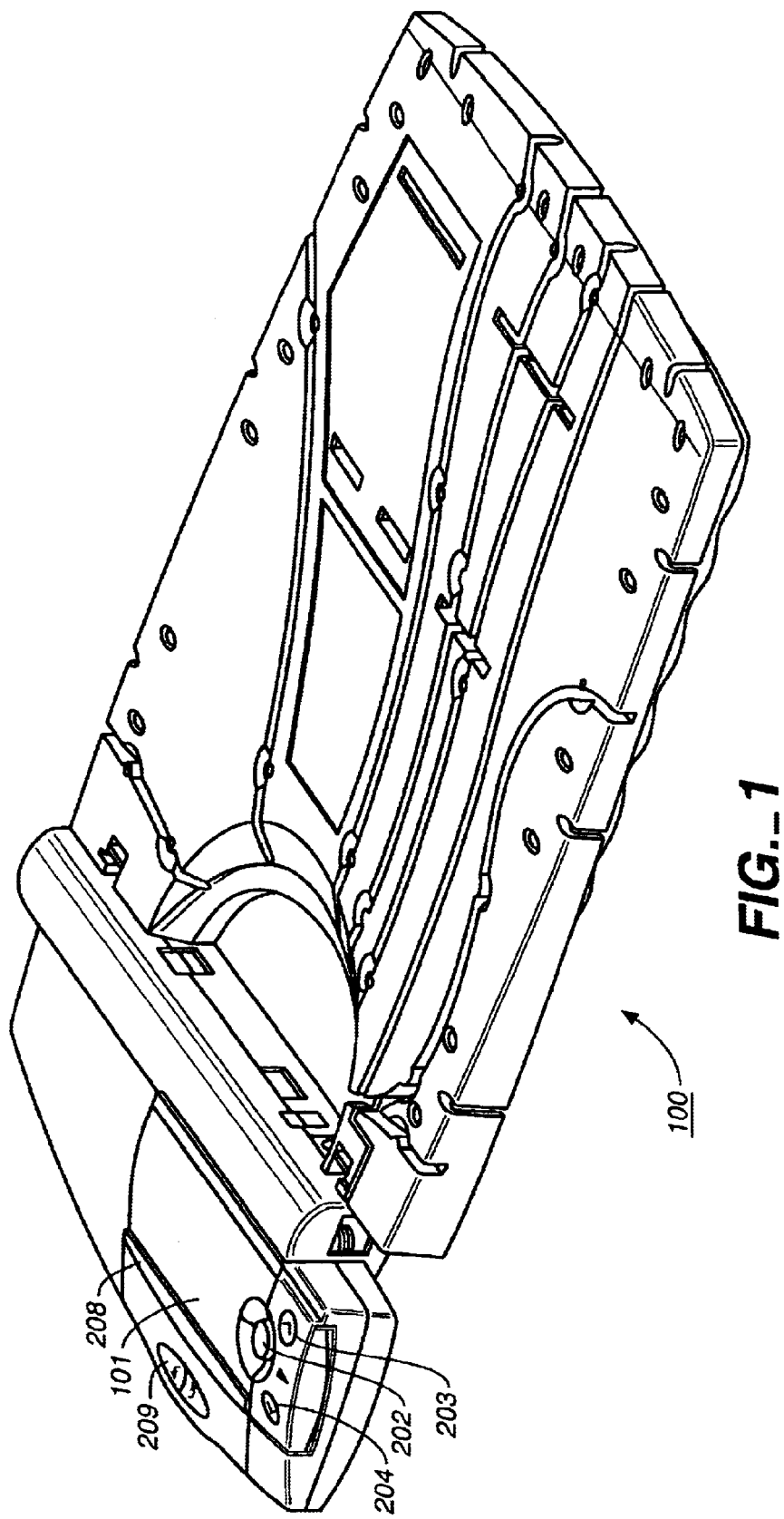
FIG._1

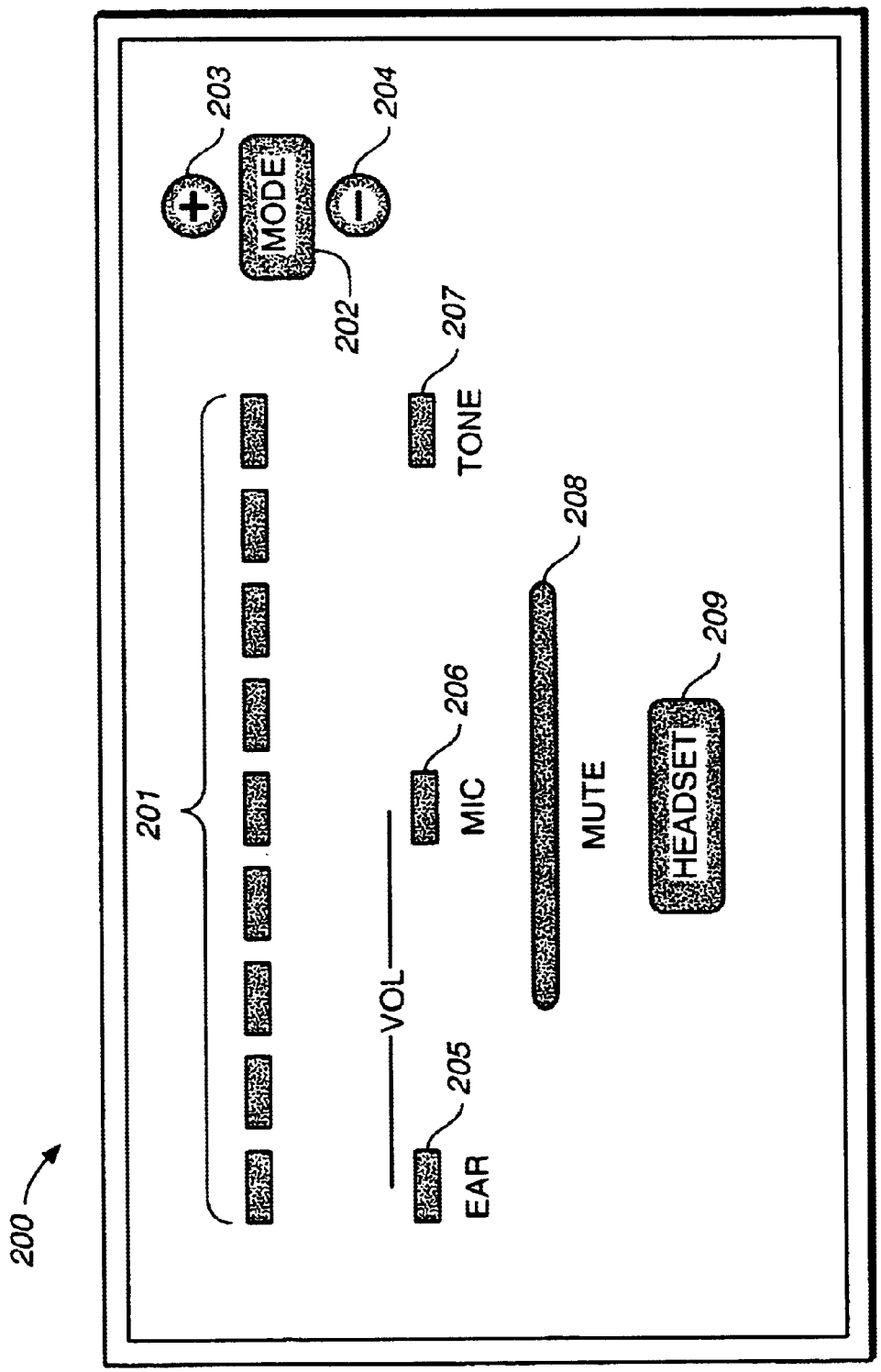
FIG._2

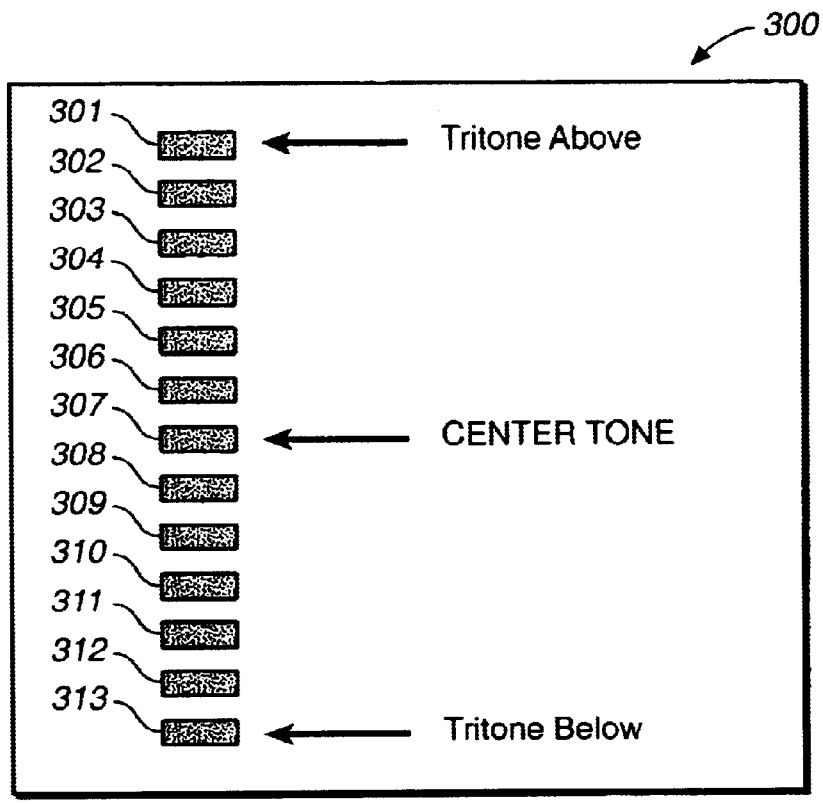
FIG._3A
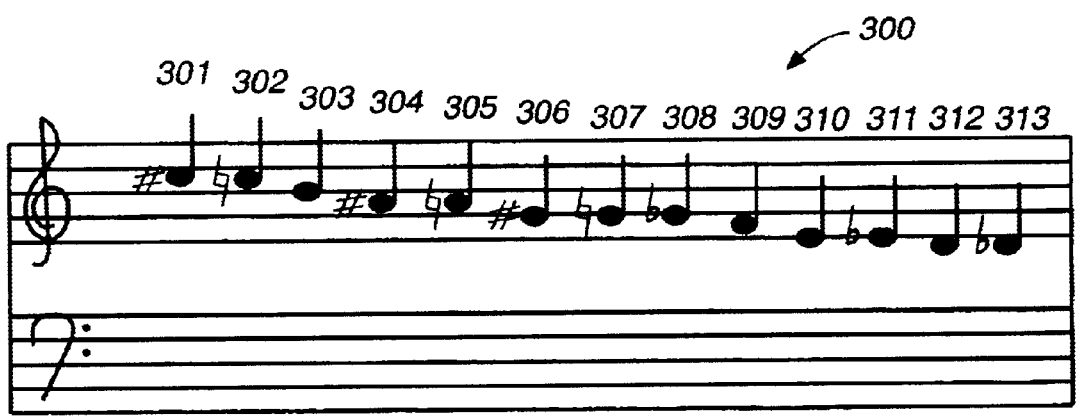
FIG._3B

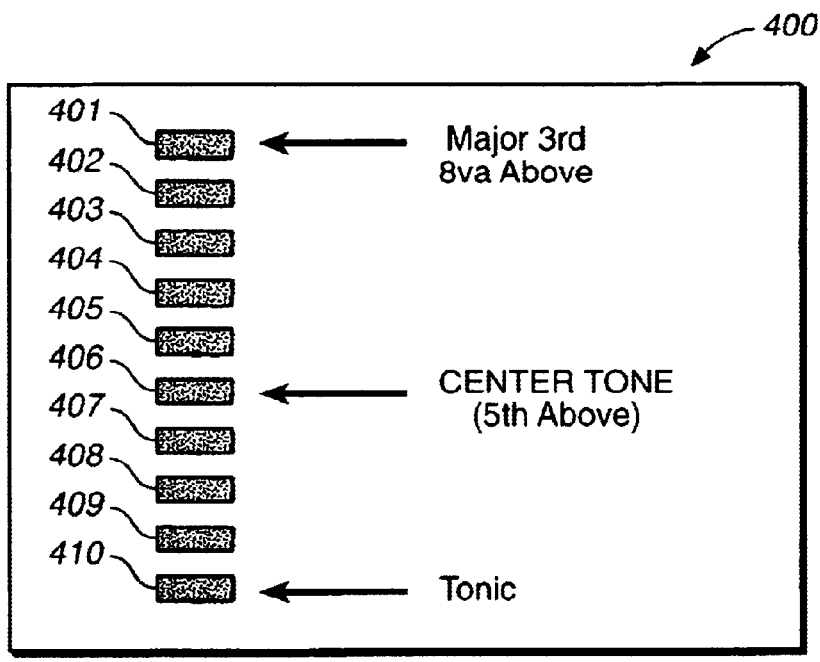
FIG._4A
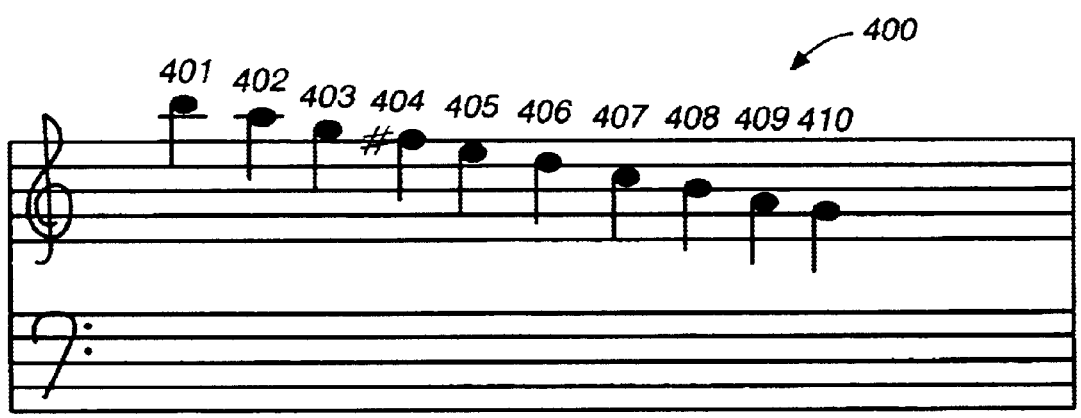
FIG._4B

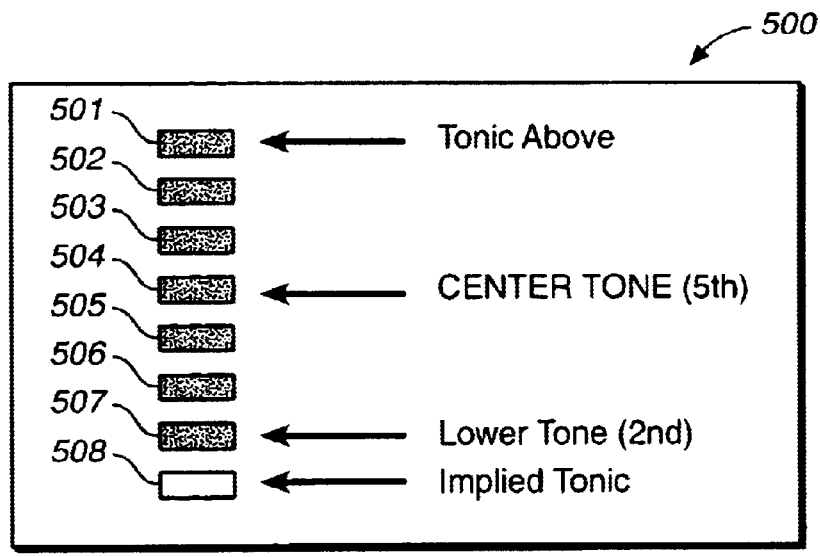
FIG._5A
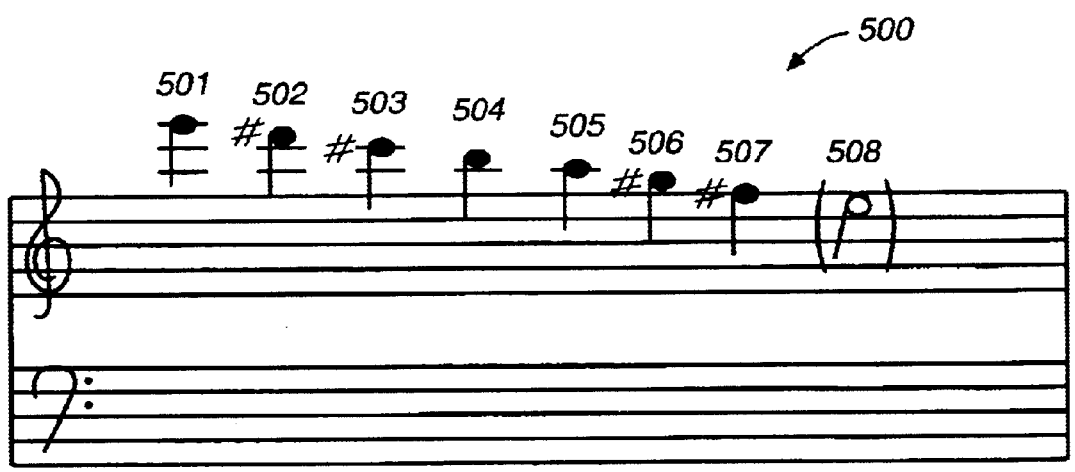
FIG._5B

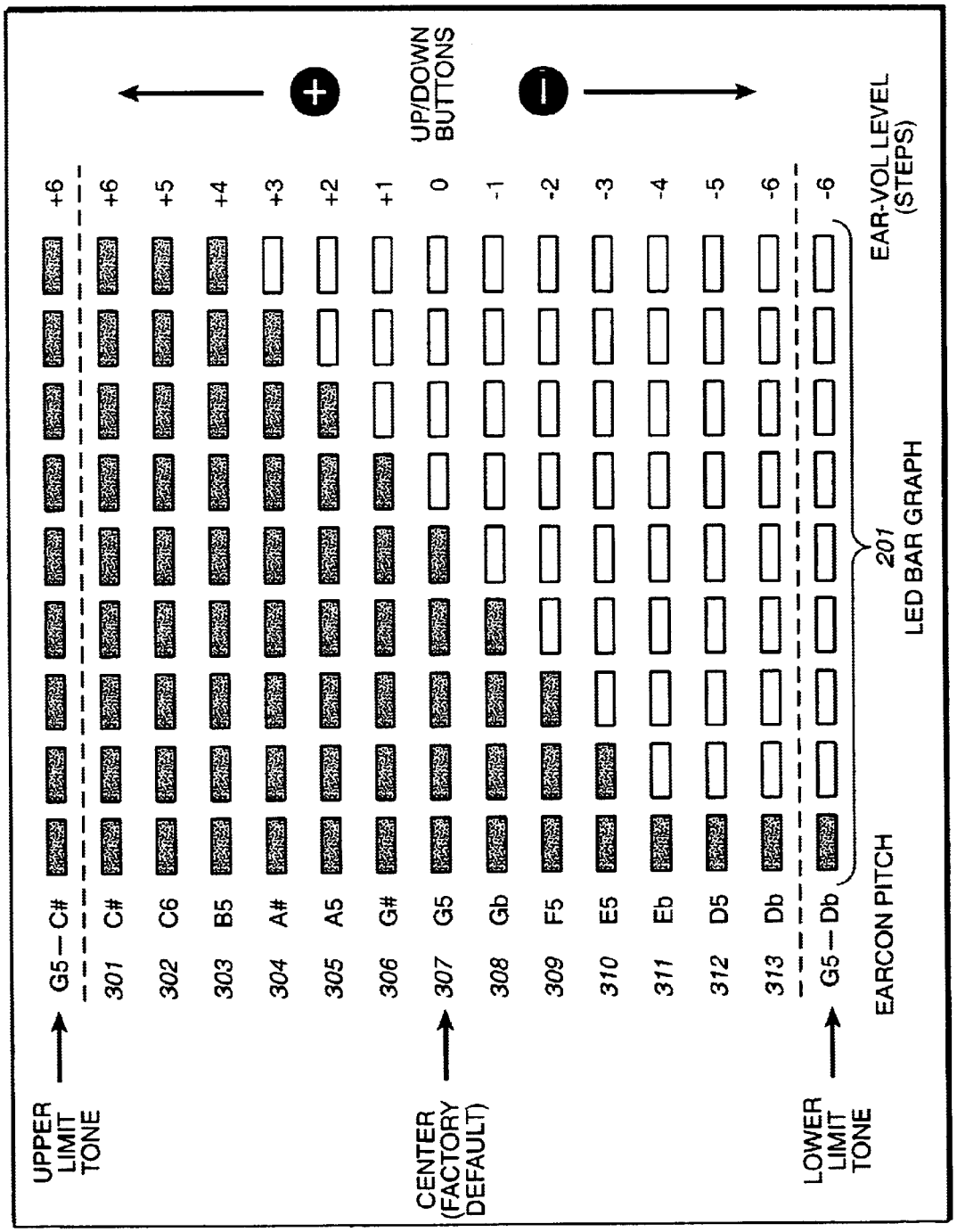
FIG._6

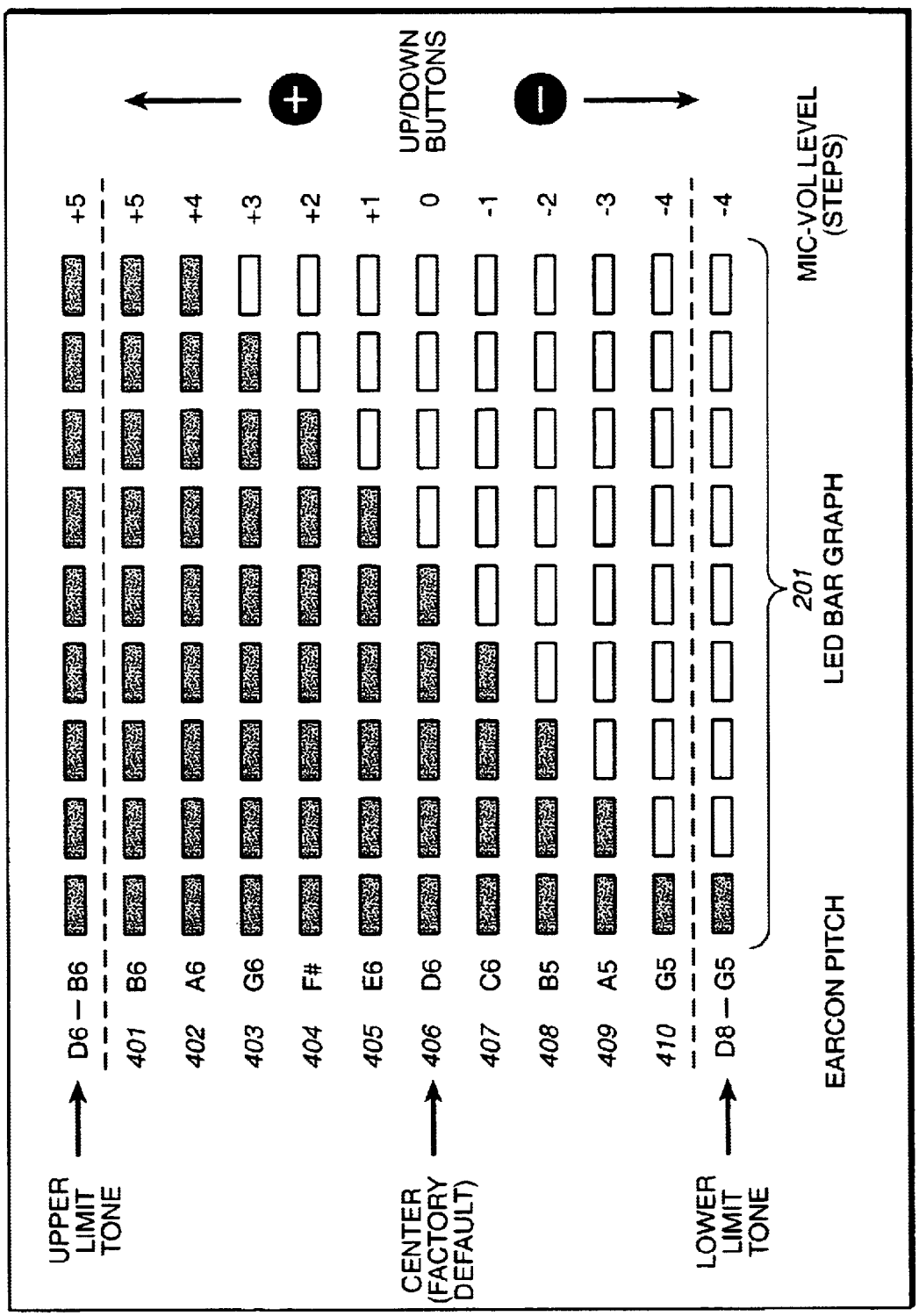
FIG._7

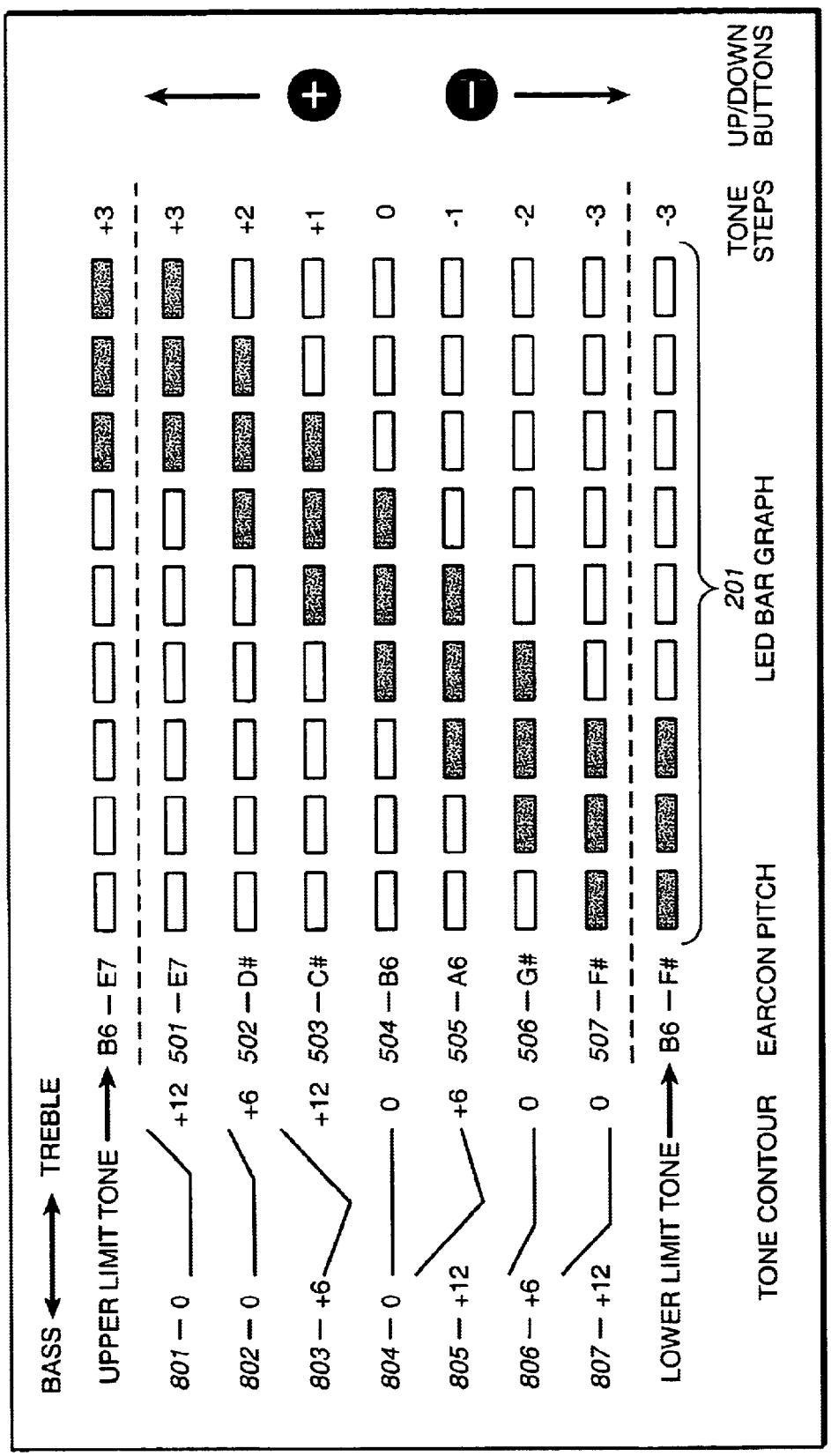
FIG._8

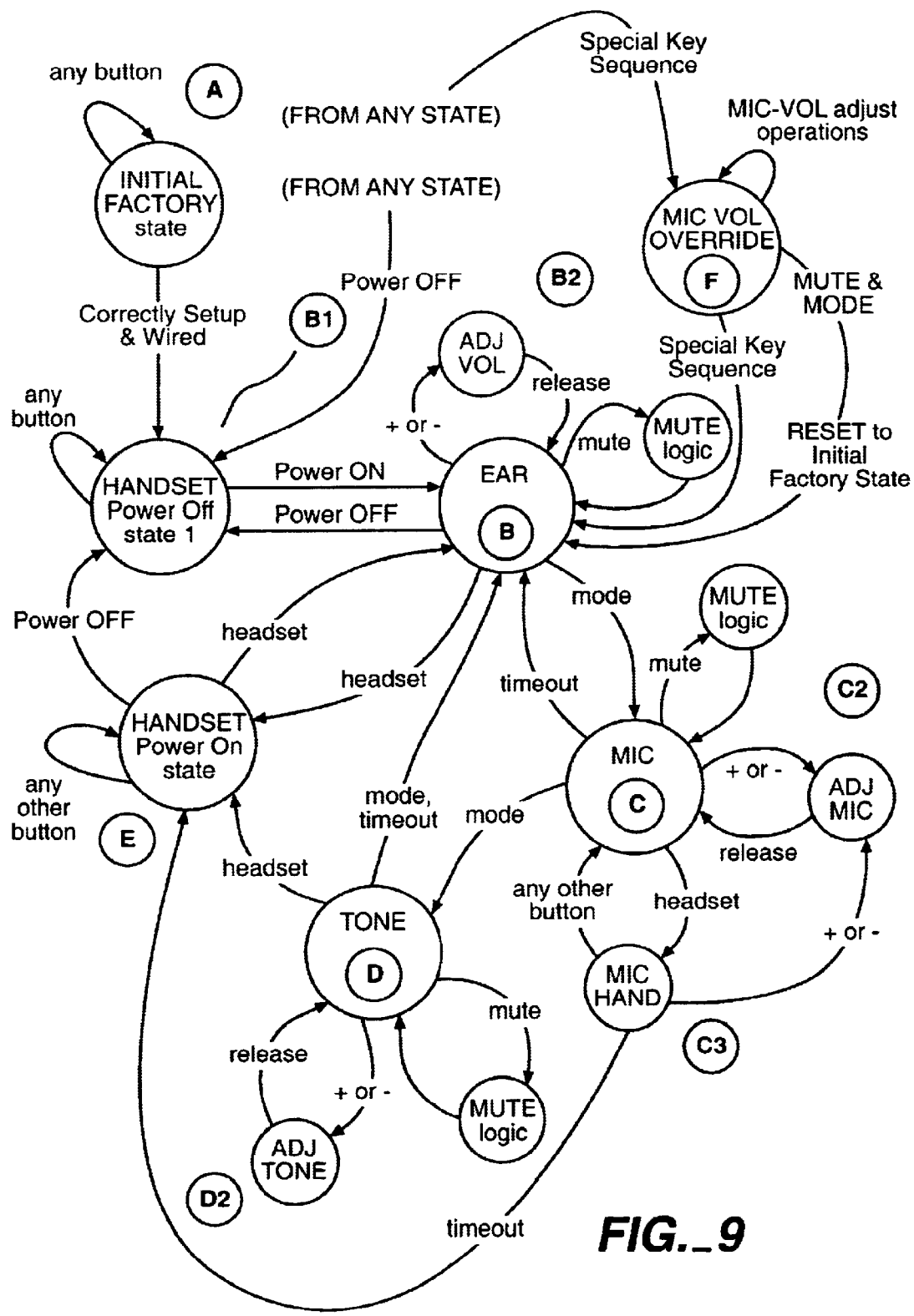
FIG._9

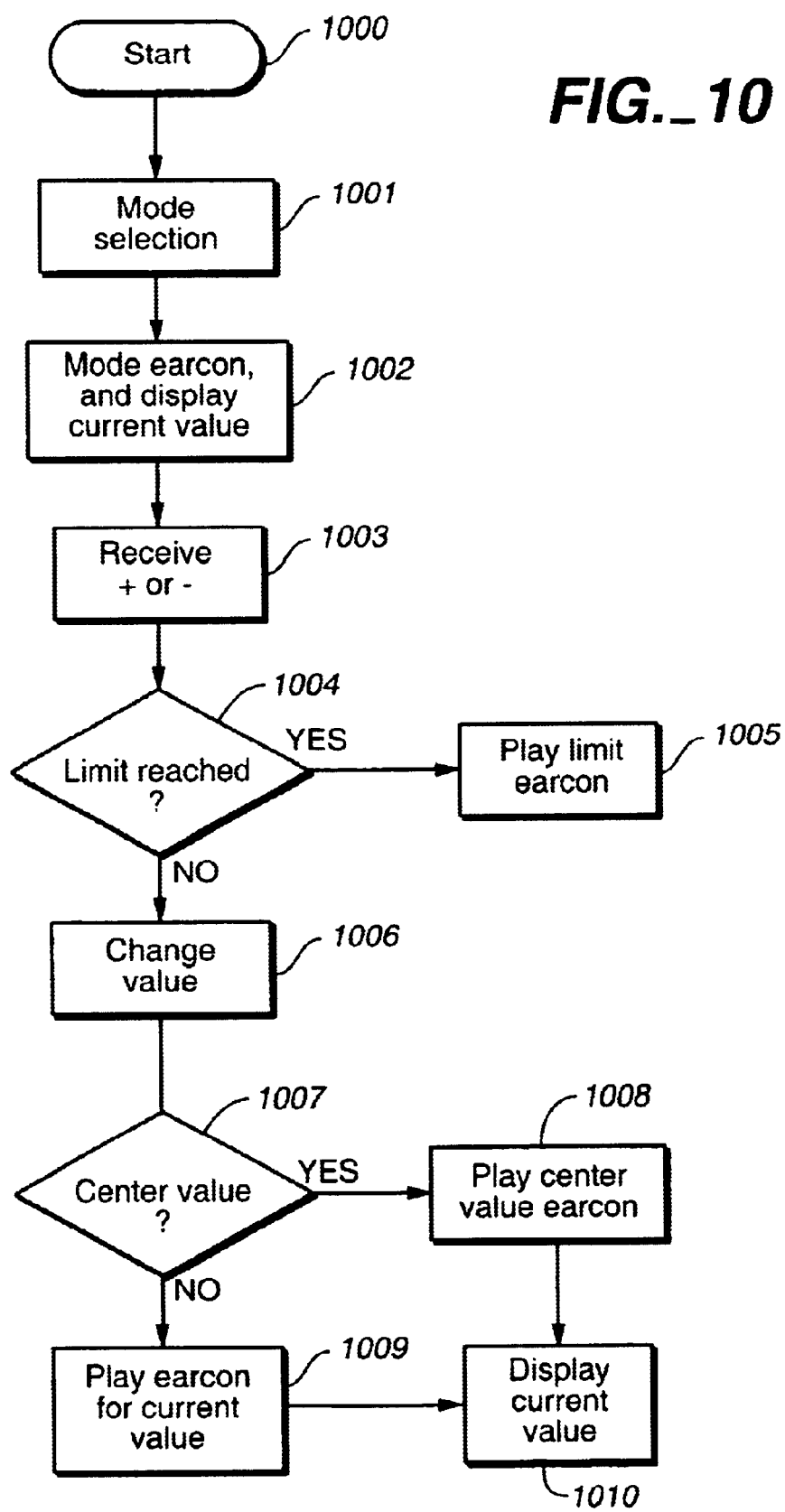
FIG._10

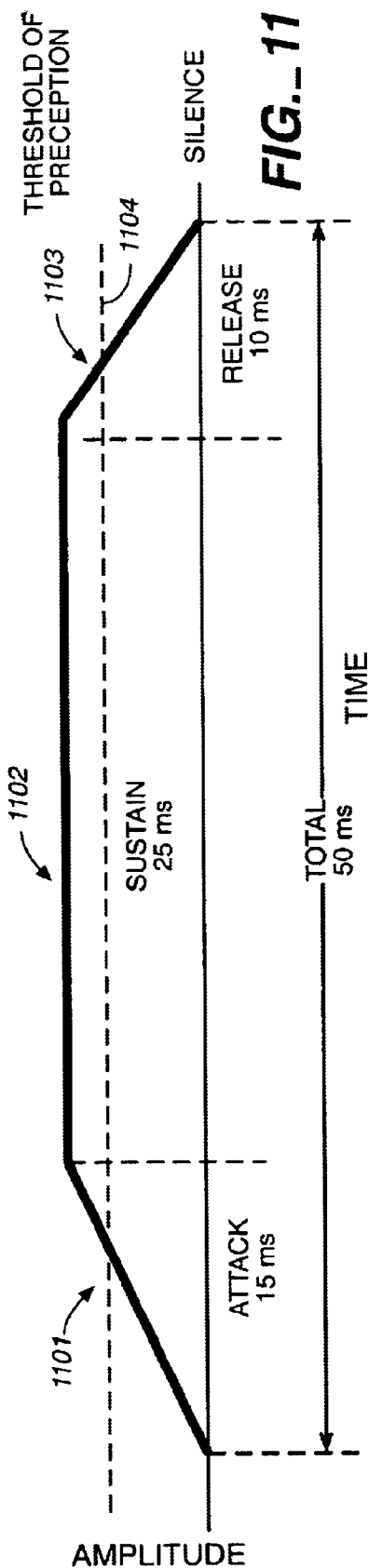
FIG._11
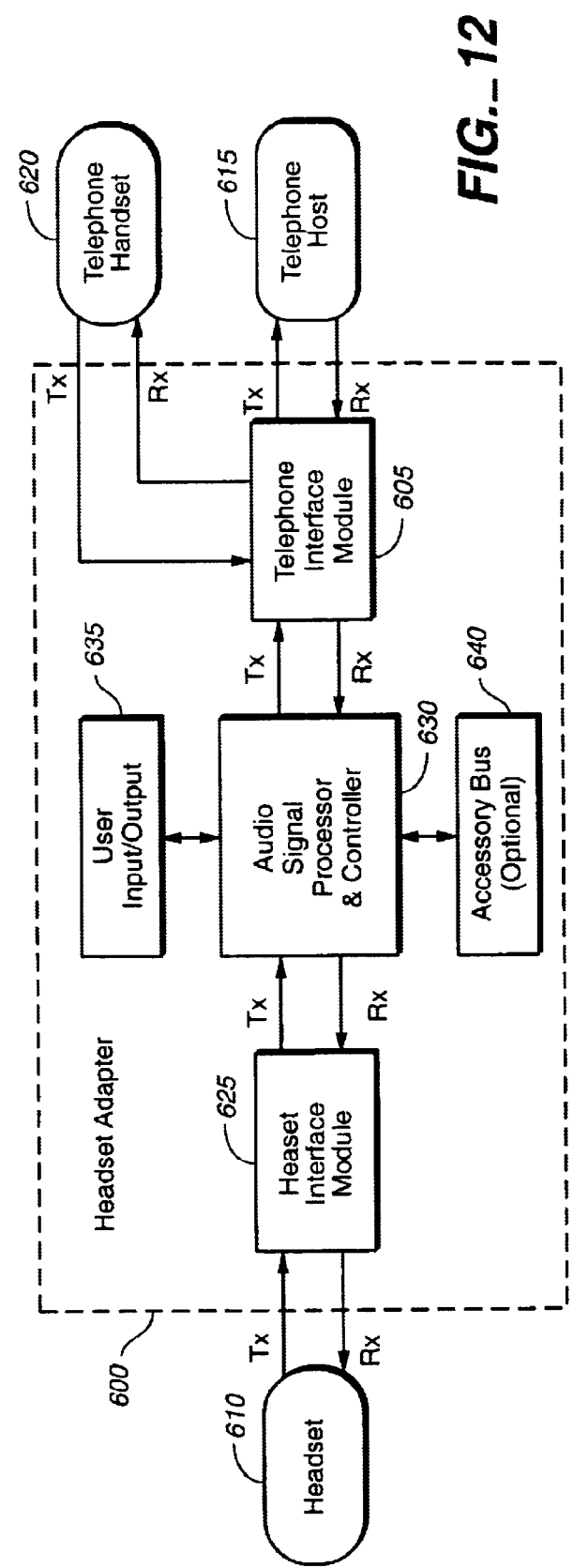
FIG._12

AUDITORY USER INTERFACE

CROSS REFERENCE TO RELATED APPLICATION

The present application is related to U.S. patent application Ser. No. 09/384,037, for "Headset Adapter with Detachable Under-the-Phone Accessory Deck", filed on Aug. 26, 1999, the disclosure of which is incorporated herein by reference.

BACKGROUND OF THE INVENTION

1. Field of the Invention

The present invention relates generally to auditory user interfaces, and more particularly to a system and method for providing an auditory user interface for use with a device such as a telephone headset.

2. Description of Background Art

For many appliances, visual user interfaces and indicators are unsuitable. This may be due to the particular environment or situation in which the appliance is to be used, or the nature of the device, or the target audience. In some situations, such as for example when a user's visual focus is necessarily directed at another task (such as driving), the use of a purely visual interface may even be hazardous or dangerous. In others, the use of a visual interface may fail to take into account the particular characteristics of some users, such as visually impaired persons.

Accordingly, many devices employ non-visual elements in their user interfaces. Commonly, other senses such as touch or hearing are used to reinforce the visual component of the interface. For example, a digital tuner in a personal stereo set (such as a Sony® Walkman®) may emit a short beep as the user adjusts the tuning; the beep may be repeated in quick succession if the user holds down the button to rapidly cycle through many frequencies. The auditory feedback is heard through the device's headphones, so that a user can perform such tuning operations without looking at the device.

Auditory user interface elements, such as the above-described examples, are known in the art as "earcons." Earcons are defined as abstract, synthetic tones that can be used in structured combinations to create sound messages to represent parts of an interface. See, for example, Balentine et al., *How to Build a Speech Recognition Application* (1999), pp. 125–40; Brewster et al., "Guidelines for the Creation of Earcons" at http://www.dcs.gla.ac.uk/~stephen/earcon_guidelines.shtml; and Blattner et al., "Earcons and Icons: Their Structure and Common Design Principles", in *Human Computer Interaction* 4, 1(1989), 11–44. In the context of the present application, the term "earcon" is used to refer to any distinctive auditory user interface element, or any sound that takes on distinguishable meaning in the context of a particular application or operation. Earcons can be thought of as auditory analogues to icons in the visual domain (i.e. distinctive interface elements that represent functions or objects).

Conventionally, earcons are not generally employed for conveying complex information to a user. In particular, for devices embodying complex operations, prior art user interfaces rely primarily on visual interfaces. Where earcons have been used as user interface elements, such use has been limited to relatively simple operations and devices, due to the difficulty in encoding or conveying complex operational or status information through simple and distinctive auditory cues.

In addition, many devices, such as telephone headset adapters, incorporate many features that can be adjusted by the user. As adapters and other devices incorporate new technology, the number of such features that can be incorporated is increasing. Conventionally, as such features are added, user access and adjustment of such features becomes more complex and requires additional buttons and user interface elements. Adding more buttons to a device may be expensive and difficult, particularly when the device is designed to be compact in size. The additional complexity from more features often leads to confusion on the part of the user, as the operation of the device becomes unduly difficult. Access to such features generally relies upon visual user interface elements that may not be suitable or available to some users in certain situations and environments.

What is needed, then, is a user interface that is capable of handling and communicating complex operations via auditory elements. What is further needed is a user interface that employs auditory elements to simplify operation of a device and facilitate use in environments and situations that are not conducive to visual-oriented user interface elements. A desirable user interface would employ auditory elements as feedback in control operations for a telephone headset adapter, and would provide easily distinguishable and recognizable auditory cues for key functions and operations. Such a user interface would further provide access to configuration and adjustment options for a wide variety of features without introducing additional buttons, visual indicators, or added complexity.

SUMMARY OF THE INVENTION

In accordance with the present invention, there is provided an auditory user interface capable of communicating complex information to a user, including representations of the current state of a parameter of a device. The invention employs a set of acoustically-related auditory elements having distinctive characteristics for communicating current values of device parameters, wherein variations in acoustic characteristics of a set of auditory elements correspond to variations in the operational parameters and/or state of the device. Thus, for example, a series of auditory elements, each having a distinct pitch, may be used to represent a set of values for a volume control function. The series of elements may belong to a particular musical scale or other logical grouping of acoustically distinguishable characteristics, so that a user can easily recognize the relationship among the auditory elements. Other control functions are distinguished by belonging to other logical groupings of acoustically distinguishable characteristics, such as differing types of musical scales, to aid the user in distinguishing auditory elements corresponding to one control function from those corresponding to another. Thus, for example, each control function may have its own tone scale, to aid the user in recognizing by tone scale which function he or she is adjusting. Alternatively, other distinguishing features, such as length of tones, sequence of tones, volume, and the like, may be used to distinguish among auditory elements within a grouping, or to distinguish one grouping from another.

Special auditory elements may be employed to indicate the center value for a parameter which has a range of potential values, or to indicate limit values for the parameter's range. For example, a double-tone may indicate an end value of the parameter setting, while a triple tone may indicate a center value.

The present invention can reinforce visual user interfaces such as lighted-lamp sequences, bar graphs, and other visual indicators. Alternatively, the present invention can be used to provide auditory feedback for control functions in the absence of visual indicators.

The present invention provides a plurality of modes for the adjustment of parameters in a device, without requiring dedicated buttons for each adjustment. A mode switch is combined with increase/decrease keys to reduce the number of buttons for adjusting parameters and thereby simplify operation. Auditory elements provide information as to which mode is currently active, and as to the current value of the parameter being adjusted. Such information may also be provided visually.

The present invention can be used, for example, for providing auditory feedback for controls in a device such as a telephone headset adapter.

BRIEF DESCRIPTION OF THE DRAWINGS

FIG. 1 is a perspective view of a telephone headset adapter for implementing one embodiment of the present invention.

FIG. 2 is a schematic view of a visual user interface for accompanying one embodiment of the auditory user interface of the present invention.

FIGS. 3A and 3B show a 13-step tone scale.

FIGS. 4A and 4B show a 10-step tone scale.

FIGS. 5A and 5B show a seven-step tone scale.

FIG. 6 is a diagram showing a relationship between a nine-step bar graph and a 13-step tone scale.

FIG. 7 is a diagram showing a relationship between a nine-step bar graph and a 10-step tone scale.

FIG. 8 is a diagram showing a relationship among a nine-step bar graph, a set of tone contours, and a 7-step tone scale.

FIG. 9 is a state transition diagram, showing primary user interface behaviors.

FIG. 10 is a flow diagram showing a change in a parameter value.

FIG. 11 is a diagram of an attack-sustain-release envelope.

FIG. 12 is a schematic block diagram of a headset adapter circuit for implementing one embodiment of the present invention.

DETAILED DESCRIPTION OF THE PREFERRED EMBODIMENTS

Referring now to FIG. 1, there is shown a perspective view of a telephone headset adapter 100 for implementing one embodiment of the present invention. Adapter 100 may be used, for example, in connecting a hands-free telephone headset to a telephone base unit. As will be seen below, the present invention is useful in providing auditory feedback for a user interface for controlling a device such as adapter 100. Adapter 100 may include, for example, a display panel 101, mode button 202, increase/decrease buttons 203 and 204, mute button 208, and headset button 209 for implementing the various functions of the user interface of the present invention.

Visual User Interface

Referring now also to FIG. 2, there is shown a schematic view of a visual user interface 200 for accompanying one embodiment of an auditory user interface of the present invention. Interface 200 may be presented, for example, on panel 101 of adapter 100 for controlling various parameters and functions of adapter 100. Bar graph 201, which may be implemented as a series of light emitting diodes (LEDs), or via a liquid crystal display (LCD)), cathode ray tube (CRT), or any other visual display technology, displays quantitative value information such as volume settings and the like. Buttons 203 and 204, labeled "+" and "−" respectively, raise and lower the settings in response to user input. Mode button 202 allows the user to select among various modes for controlling different sets of parameters. For example, in one embodiment, pressing mode button 202 cycles among earphone volume, microphone volume, and tone. Visual indicators 205, 206, and 207 indicate which mode is currently active, and bar graph 201 shows the current value for the parameter associated with the current mode. The user may cycle through the modes to check settings by looking at the bar graph 201. The user may also cycle through modes in order to activate a particular mode whose parameter he or she wishes to adjust. Once in the desired mode, the user presses the "+" and "−" buttons to adjust the parameter value, and can monitor the progress of the adjustment using bar graph 201. Higher values for the parameter are indicated by more visual indicators being illuminated in bar graph 201. Conversely, lower values for the parameter are indicated by fewer visual indicators being illuminated in bar graph 201.

In one embodiment of the present invention, the auditory user interface provides support for several user functions related to operation of a telephone headset. Examples of such functions include:

Raising or lowering the volume (loudness) of the audio signal as heard through the headset earpiece (speakers).

Raising or lowering the volume (loudness) of the audio signal being transmitted from the headset microphone to the telephone.

Adjusting the tone contour (i.e. treble-bass) of the audio signal as heard through the headset speakers.

Raising or lowering the volume (loudness) of the auditory elements (earcons).

In general, the user may perform any of the above functions by changing the mode as appropriate, and using the "+" or "−" buttons to change the value of the parameter. Volume of auditory indicators, including "earcons" as described below, is adjusted by pressing the "+" or "−" buttons while holding down the mute button. In any of the functions, holding down the "+" or "−" buttons causes the value of the parameter to: continue to change in the appropriate direction, until the button is released. Additional utility and support functions are also provided, as may be appropriate for the particular device.

Earphone volume mode, indicated by indicator 205, permits adjustment of the loudness of a remote party's voice in the earpiece (speakers) of the headset. Microphone volume mode, indicated by indicator 206, permits adjustment of the loudness of the user's voice as heard by the remote party. Tone mode, indicated by indicator 207, permits adjustment of the spectral tone quality (i.e., treble or bass) of the remote party's voice in the earpiece of the headset. In one embodiment, the system reverts to earphone volume mode after an idle time.

Mute button 208 is used to temporarily mute the telephone headset microphone; in one embodiment, mute button 208 contains an indicator which illuminates or blinks when the headset microphone is muted. Headset button 209 toggles between the headset and a second device such as a conventional telephone handset.

The internal operation of adapter 100 and user interface 200 are not described in detail here, as they will be apparent to one skilled in the art, given the behaviors and specifications provided in the description below. A functional block diagram of a headset adapter circuit that may be used to implement the present invention is described below in connection with FIG. 12.

Earcons

In one embodiment of the present invention, a set of auditory user interface elements, or "earcons" are provided and, if desired, associated with the various elements and modes of the user interface 200 shown in FIG. 2. The earcons may be output, for example, through the headset, or through a separate speaker. In alternative embodiments of the invention, alternative tonal relationships among auditory user interface elements are employed, including for example, found sounds and signature sounds. A found sound is a recorded natural sound that is isolated from its original environment, while a signature sound is a sound that has an association with an object, entity, or concept. See Balentine et al., at pp. 126–27.

A mode earcon, such as for example a triple-beep, is sounded to indicate that a new mode is active, as will be described below. As an alternative to checking settings visually, the user may cycle through the modes and listen for the pitch of the mode earcon to determine each setting. When adjusting parameters, the user can monitor the progress of the adjustment by listening to value earcons, as described below. Higher values for the parameter are indicated by earcons acoustically and logically related to the mode earcon (for example, earcons having higher pitch), while lower values for the parameter are indicated by other earcons acoustically and logically related to the mode earcon (for example, earcons having lower pitch). Limit values and center values are indicated by special earcons, as described below.

The earcon volume is adjusted by pressing the "+" or "−" buttons while holding down the mute button. In any of the functions, holding down the "+" or "−" buttons causes the value of the parameter to continue to change in the appropriate direction, until the button is released. Additional utility and support functions are also provided, as may be appropriate for the particular device.

As will be seen below, the present invention allows the user to distinguish among the above functions, and the modes used to perform the functions, by providing tones which belong to distinct musical scales. Thus, for example, the earcons for microphone volume mode belong to one musical scale, while the earcons for tone mode belong to a different musical scale. Other techniques for acoustically distinguishing among groups of earcons may also be used.

User Interface Flow

Referring now to FIG. 10, there is shown a flow diagram of a sequence of steps for changing a value for a parameter, according to one embodiment of the present invention. A mode selection 1001 is received, by the user cycling through available modes using a mode button 202 or other switch mechanism (e.g. rotary dial, slider, and the like). A mode earcon is sounded 1002 to indicate the selected mode, and bar graph 201 displays the current value for the parameter associated with the selected mode. In one embodiment, the mode earcon is a triple-tone. When the user presses "+" or "−" button 203 or 204, this is received 1003 by the system. If the limit is reached 1004 for the parameter, a limit earcon 1005 is played. If the limit is not reached, the value for the parameter is changed 1006 accordingly. If the change results in the center value being reached 1007, a center value earcon (such as for example a triple-tone) is played 1008. If the center value has not been reached, an earcon representing the current value of the parameter is played 1009. In addition, the current value for the parameter is displayed 1010 visually using bar graph 201, by lighting a subset of visual indicators corresponding to the value. The steps of FIG. 10 may be repeated as often as desired by the user.

Sets of Earcons

As will be apparent to one skilled in the art, many types of earcons, or audio interface elements, may be employed without departing from the spirit or essential characteristics of the claimed invention. Such earcons may be distinguished by various acoustic characteristics, such as pitch, volume, length, sequence of notes, speed, or any combination of the above factors. One example of a set of earcons that may be used in the present invention in connection with user interface 200 is as follows:

Tone mode indicator. A triplet (triple-tone sequence), for example having a high pitch with each note having a duration of 50 ms and with 30 ms silence between tones for a total duration of 210 ms. Serves as button press feedback, mode change announcement, and as a specific indicator for tone mode. The triplet also marks the center, or flat, position of the tone scale.

Increase/decrease indicator. A single "blip", or short tone, for example 50 ms in duration. The pitch belongs to a particular musical scale associated with the current mode. The particular note within the scale is selected based on the current value of the parameter being adjusted. A single press of the "+" button increments the current value of the parameter and thereby increments the pitch by one note on the scale. Conversely, a single press of the "−" button decrements the current value and thereby decrements the pitch by one note on the scale. The increase/decrease indicator serves as button press feedback and "+"/"−" indication. Also, since the user has heard the triplet (center setting) upon entering the mode, the increase/decrease indicator conveys the current setting relative to the center.

Limit reached indicator. A two-note sequence of tones to indicate that the user has reached the upper or lower limit of the range for the parameter corresponding to the currently selected mode. Duration of each tone may be, for example 50 ms, with 30 ms silence between the tones for a total duration of 130 ms. The first note is pitched at the center of the currently-selected mode (i.e., the same pitch as the mode indicator triplet). This serves to indicate and confirm to the user the parameter being adjusted. The second note is pitched at the upper- or lower-limit scale position for the currently-selected mode. Thus, for example, if the upper limit is reached, the sequence is upward-sounding (i.e., center tone, followed by upper limit tone), with a musical interval that identifies both the center of the scale and the upper limit of the range. Conversely, if the lower limit is reached, the sequence is downward-sounding, with an interval that identifies both the center of the scale and the lower limit of the range.

Turning specifically to headset 100, earcons can be used as follows:

Earphone volume mode indicator: A triplet (i.e., three notes in succession), low in pitch. Serves as button press feedback, mode-change announcement, and as a specific indicator for earphone volume mode. The triplet also marks the center, or default, position of the earphone volume scale.

Microphone volume mode indicator. A triplet, medium pitch. Serves as button press feedback, mode change announcement, and as a specific indicator for microphone volume mode. The triplet also marks the center, or auto-sensed, position of the microphone volume scale.

Mute indicator. A single beep. Pitched at some medium pitch that is tonally related to the earphone volume mode indicator. Somewhat longer than the short blips of the other tones, e.g. roughly 500 ms in duration.

Beep volume indicator. A triple tone that outlines a major triad. Played when the user manipulates the beep volume button combination (a special combination of buttons for changing the volume of beeps). The amplitude of the triple tone varies as the user presses increase or decrease buttons. The purpose is to provide auditory feedback that allows the user to know the current loudness of the earcons themselves. Thus, the set of earcons for the beep volume indicator vary by volume rather than by pitch. Conversely, in another embodiment, if other earcon sets vary by volume, the set of earcons for the beep volume can be made to vary by pitch rather than by volume.

Other auditory elements may also be provided, as may be needed or useful for providing feedback as to various other functions. Some of these functions may require holding down various combinations of buttons, so as to reduce the possibility of the user accidentally activating a utility function.

When any of the above functions is applied repeatedly, e.g. when the user holds down the "+" or "−" button, the associated earcon is played repeatedly in rapid succession (using different successive pitches as the value of the parameter changes). For example, in one embodiment, holding down the "+" or "−" button causes the adjustment to be re-applied every 100 ms, so that the earcon is replayed to reflect the new value of the parameter every 100 ms. In one embodiment, re-application of the function does not begin until the button has been held for a predefined length of time, such as for example one full second. In one embodiment, when a center value or limit value is reached, the device ceases re-applying the adjustment, and the earcon is not repeated unless the user releases and re-presses the button.

Tonal Relationships

In one embodiment of the present invention, each set of earcons, corresponding to a mode for changing a particular parameter, belongs to a distinct tonal range. Thus, the earcons provide feedback regarding mode selection and parameter values, because the user learns to identify parameters by their distinctly sounding earcons. Essentially, the earcons associated with a particular parameter belong to an audio "bar graph" that correlates with visual bar graph 201 described above. Frequencies for particular earcons are based on the tonal range for the earcon set.

Referring now to FIGS. 3A and 3B, there is shown a 13-step tone scale 300 including tones 301 to 313. In one embodiment, tone scale 300 such as that shown in FIGS. 3A and 3B is used for the earphone volume mode. FIG. 3A shows tone scale 300 as an audio bar graph, while FIG. 3B shows tone scale 300 using conventional musical notation. Tone scale 300 is a chromatic scale, with each note on the scale being a half-tone away from its neighbors. Top tone 301 and bottom tone 313 form a perfect octave, as they are twelve half-tones apart. Center tone 307 is pitched on G5 (the G note of the fifth octave on a piano). Top tone 301 and bottom tone 313 are thus pitched at C-sharp (or D-flat), which is at a tritone interval (i.e. exactly one-half octave) with respect to center tone 307.

Each press of the "−" button steps down the scale by one half-tone interval, until lower limit 313 is reached. Each press of the "+" button steps up the scale by one half-tone interval, until upper limit 301 is reached. As described above, the limit-reached earcon is a two-tone sequence that reminds the user of both the center tone 307 and the limit tone 301 or 313. Since tritones are the most dissonant musical intervals, the two-tone limit earcons are most effective at gaining the user's attention when the limit is reached.

As will be seen below, tone scale 300 is musically related to other tone scales that may be used for other modes. For example, the center tone (G5) of tone scale 300 establishes the root of a G-Major triad, while the center tones for the other modes represent the third and fifth (B6 and D6) of the triad.

The following table illustrates the 13-step tone scale of FIGS. 3A and 3B according to one embodiment, and also describes the two-note and three-note sequences for the limits and center steps.

| Earcon | Notes (Hz) | Relative Step |
|---|---|---|
| Upper limit | G5 (783.99), C# (1108.70) | +6 |
| 13th step 301 | C# (1108.70) | +6 |
| 12th step 302 | C6 (1046.50) | +5 |
| 11th step 303 | B5 (987.77) | +4 |
| 10th step 304 | A# (932.33) | +3 |
| 9th step 305 | A5 (880.00) | +2 |
| 8th step 306 | G# (830.61) | +1 |
| 7th (center) step 307 | G5 (783.99), G5 (783.99), G5 (783.99) (triplet) | 0 |
| 6th step 308 | Gb (739.99) | −1 |
| 5th step 309 | F5 (698.46) | −2 |
| 4th step 310 | F5 (659.26) | −3 |
| 3rd step 311 | Eb (622.25) | −4 |
| 2nd step 312 | D5 (587.23) | −5 |
| 1st step 313 | Db (554.37) | −6 |
| Lower limit | G5 (783.99), Db (554.37) | −6 |

The chromatic interval is the smallest relevant interval in conventional tonal music. By using the 13-step chromatic tone scale 300 for the earphone volume mode, one embodiment of the invention helps the user perceive that the volume steps are close together. Since tone scale 300 is used, in one embodiment, in conjunction with the nine-step visual bar graph 201 of the visual user interface, the chromatic scale 300 provides additional information beyond that provided by the visual display, and thereby helps make the earcons synergistic, rather than merely redundant, with visual bar graph 201. In one embodiment, the earcons provide indications extending beyond the range of bar graph 201, for example showing two volume steps at the top of the volume range, and two at the bottom of the volume range, that are not indicated by bar graph 201.

In addition, as described above, some users may rely on the earcons because viewing of bar graph 201 during operation of the device may be difficult or impossible.

Referring now to FIGS. 4A and 4B, there is shown a 10-step tone scale 400 including tones 401 to 410. In one embodiment, tone scale 400 is used for the microphone volume mode. FIG. 4A shows tone scale 400 as an audio bar graph, while FIG. 4B shows tone scale 400 using conventional musical notation. Tone scale 400 is a major diatonic scale in the key of G (i.e. a scale containing five whole tones and two semitones, namely: G, A, B, C, D, E, F#, G). Center tone 406 is the fifth (dominant) step of the scale. Top tone 401 is at a major 3rd one octave above bottom tone 410.

Each press of the "−" button steps down the scale by one note in the diatonic scale, until lower limit 410 is reached. Each press of the "+" button steps up the scale by one note in the diatonic scale, until upper limit 401 is reached. As described above, the limit-reached earcon is a two-tone sequence that reminds the user of both the center tone 406 and the limit tone 401 or 410.

The following table illustrates the 10-step tone scale 400 of FIGS. 4A and 4B according to one embodiment, and also describes the two-note and three-note sequences for the limits and center steps.

| Earcon | Notes (Hz) | Relative Step |
|---|---|---|
| Upper limit | D6 (1174.70), B6 (1975.50) | +5 |
| 10th step 401 | B6 (1975.50) | +5 |
| 9th step 402 | A6 (1760.00) | +4 |
| 8th step 403 | G6 (1568.00) | +3 |
| 7th step 404 | F# (1480.00) | +2 |
| 6th step 405 | E6 (1318.50) | +1 |
| 5th (center) step 406 | D6 (1174.70), D6 (1174.70), D6 (1174.70) (triplet) | 0 |
| 4th step 407 | C6 (1046.50) | −1 |
| 3rd step 408 | B5 (987.77) | −2 |
| 2nd step 409 | A5 (880.00) | −3 |
| 1st step 410 | G5 (783.99) | −4 |
| Lower limit | D6 (1174.70), G5 (783.99) | −4 |

By using different scales for microphone volume mode and earphone volume mode, the present invention allows the user to easily distinguish between the two modes. Furthermore, since the range for adjustment of the microphone volume is narrower than that of the earphone volume, scale 400 uses fewer steps than scale 300, and it uses a major diatonic scale rather than the chromatic scale. In addition, for each scale, the mode indicator is consonant with (i.e., musically related to) the dominant tone of the scale, further linking the mode with the scale in the user's mind.

Referring now to FIGS. 5A and 5B, there is shown a seven-step tone scale 500 including tones 501 to 507. In one embodiment, tone scale 500 is used for the tone adjustment mode. FIG. 5A shows tone scale 500 as an audio bar graph, while FIG. 5B shows tone scale 500 using conventional musical notation. Tone scale 500 is a major diatonic scale in the key of E, though the lower tonic 508 (i.e. the base note of the scale) is implied but never heard. Center tone 504 is the fifth (dominant) step of the scale. Top tone 501 is one octave above implied lower tonic 508.

Each press of the "−" button steps down the scale by one note in the diatonic scale, until lower limit 507 is reached. Each press of the "+" button steps up the scale by one note in the diatonic scale, until upper limit 501 is reached. As described above, the limit-reached earcon is a two-tone sequence that reminds the user of both the center tone 504 and the limit 501 or 507.

The following table illustrates the seven-step tone scale 500 of FIGS. 5A and 5B according to one embodiment, and also describes the two-note and three-note sequences for the limits and center steps.

| Earcon | Notes (Hz) | Relative Step |
|---|---|---|
| Upper limit | B6 (1975.50), B7 (2637.00) | +3 |
| 7th step 501 | E7 (2637.00) | +3 |
| 6th step 502 | D# (2489.00) | +2 |
| 5th step 503 | C# (2217.50) | +1 |
| 4th (center) step 504 | B6 (1975.50), B6 (1975.50), B6 (1975.50) (triplet) | 0 |
| 3rd step 505 | A6 (1760.00) | −1 |
| 2nd step 506 | G# (1661.20) | −2 |
| 1st step 507 | F# (1480.00) | −3 |
| Lower limit | B6 (1975.50), F# (1480.00) | −3 |

By using a different scale for tone adjustment mode than the scale used for the other modes, the present invention allows the user to easily distinguish among the modes. Furthermore, since the range for adjustment of the tone is narrower than that of the earphone volume, scale 500 uses fewer steps than scale 300, and it uses a major diatonic scale rather than the chromatic scale. The user can easily distinguish between scales 500 and 400 because, although they are both major diatonic scales, they are in different keys. In addition, for each scale, the mode indicator is consonant with the dominant tone of the scale, further linking the mode with the scale in the user's mind.

By providing a distinct auditory characteristic (such as a particular tone scale) for each earcon set, the present invention allows the user to easily distinguish among the earcon sets and thereby recognize which mode is currently active and which device parameter is being adjusted. Furthermore, as described above, all limit earcons (in one embodiment) are sequences of two notes, while all center earcons are triplets. Thus, a second distinct auditory characteristic, such as number of tones in the earcon, is used to denote a particular type of indicator. This relationship among earcons allows the user to easily recognize a particular type of indicator regardless of which mode is currently active. The two distinct auditory characteristics; (here, volume and pitch) are selected so that they are essentially orthogonal and independent of one another, so that the relationship among earcons in a particular mode is conveyed, as well as the relationship among similar indicators for different modes.

The following table illustrates the orthogonality of the two distinct auditory characteristics, and their operation in one embodiment of the present invention. Each row in the table corresponds to a mode of the device. For each mode, the distinct characteristic is shown, along with the particular earcons used as indicators for the mode, a particular value for the parameter being modified, and limit and center indicators. The above-described earcon sets are merely exemplary. One skilled in the art will recognize that many other distinct characteristics may be used, such as frequency range, timbre, loudness, pattern or length of the tones, and the like. In addition, the modes here pertain to a headset adapter or similar device. Those with skill in the art will recognize that completely different modes could be used here for different devices.

| Mode/Parameter | Distinct characteristic | Mode indicator | Value indicator | Limit indicator | Center indicator |
|---|---|---|---|---|---|
| Earphone volume | Chromatic scale | G5, G5, G5 | Single tone on chromatic scale | G5, C# or G5 Db | G5, G5, G5 |
| Microphone volume | G-major diatonic scale | D6, D6, D6 | Single tone on G-major diatonic scale | D6, B6 or D6, G5 | D6, D6, D6 |

-continued

| Mode/ Parameter | Distinct characteristic | Mode indicator | Value indicator | Limit indicator | Center indicator |
|---|---|---|---|---|---|
| Tone | E-major diatonic scale | B6, B6, B6 | Single tone on E-major diatonic scale | B6, E7 or B6, F# | B6, B6, B6 |

In general, each mode is associated with a distinct characteristic such as a particular scale, and has a mode indicator (such as a three-tone earcon), a value indicator (such as a one-tone earcon), a limit indicator (such as a two-tone earcon including the center tone and a limit tone), and a center indicator (such as a three-tone earcon).

Timing, Energy, and Rhythm

In one embodiment, earcon tones have the following durations, though alternative durations may be used:

| Earcon | Notes | Duration | Silence Between | Total Duration |
|---|---|---|---|---|
| Mode and Center | 3 | 50 ms | 30 ms | 210 ms |
| Limit reached | 2 | 50 ms | 30 ms | 130 ms |
| Step tone | 1 | 50 ms | — | — |

The energy envelopes for the tones specify the attack, sustain, and release times. In one embodiment, relatively "soft" tones are used, so that the tones act as secondary reinforcement for hearing users, and are almost subliminal. In addition, non-sighted users often have extremely sensitive hearing, so that "hard" tones would be disturbing. In one embodiment, the energy envelopes are customizable to the user's preference.

Referring now to FIG. 11, there is shown an example of an attack-sustain-release envelope as used by one embodiment. The tone rises in volume within attack time 1101 to its steady-state value, which is preferably just above threshold of perception 1104, and holds it for sustain time 1102. The tone then falls in volume within release time 1103, to silence. In one embodiment, attack time is 15 ms, sustain time is 25 ms, and release time is 10 ms, for a total length of 50 ms for the tone. Other values may be used. In an alternative embodiment, the volume level during the sustain time is lower than the volume level at the peak of the attack; a "decay" time can be specified to indicate the length of time between the peak of the attack and the beginning of the sustain period.

In one embodiment, all tones are synthesized to start and end at zero-crossings, so as to eliminate "clicks" and "pops". All tones are sinusoids.

In one embodiment, earcons are output using the telephone headset, and are therefore mixed with the incoming signal the user is hearing through the headset. It is preferable, though not necessary, that the earcons be mixed in such a way that they are not distracting and do not overpower the incoming signal. In one embodiment, the earcon volume level in the user's headset does not change when the earphone volume is adjusted.

For multi-tone earcons, the same envelope as shown in FIG. 11 may be used, with an interval of silence between each tone, such as for example 30 ms. As described above, triplet earcons in one embodiment use tones of the same frequency, repeated three times, in order to make the rhythmic character of the earcon distinctive.

Mapping Between Visual Bar Graph and Tone Scales

In one embodiment, the present invention is implemented as an auditory user interface which accompanies a visual user interface. As described above, the visual user interface may include bar graph 201 having a number of visual indicators such as LEDs, LCDs, and the like. The present invention thus provides auditory confirmation and feedback that complements the display of bar graph 201.

Referring now to FIG. 6, there is shown a relationship between a nine-step bar graph 201 and a 13-step tone scale 300 as described above in connection with FIGS. 3A and 3B. The nine steps of bar graph 201 are mapped onto tone scale 300 as follows:

upper limit tone, as well as the top three notes 301–303 of the scale, are mapped to a display of all nine indicators;

each successive tone 304–311 is mapped to a display of one fewer indicator than the previous note;

the lower limit tone, as well as the lowest three notes 311–313 of the scale, are mapped to a display of one indicator.

Referring now to FIG. 7, there, is shown a relationship between a nine-step bar graph 201 and a 10-step tone scale 400 as described above in connection with FIGS. 4A and 4B. The nine steps of bar graph 201 are mapped onto tone scale 400 as follows:

the upper limit tone, as well as the top two notes 401–402 of the scale, are mapped to a display of all nine indicators;

each successive tone 403–410 is mapped to a display of one fewer indicator than the previous note;

the lower limit tone, as well as the lowest note 410 of the scale, are mapped to a display of one indicator.

Referring now to FIG. 8, there is shown a relationship between a nine-step bar graph 201 and a seven-step tone scale 500 as described above in connection with FIGS. 5A and 5B. The nine steps of bar graph 201 are mapped onto tone scale 500 as follows:

the upper limit tone, as well as the top note 501 of the scale, are mapped to a display of the rightmost three indicators;

each successive tone 502–507 is mapped to a display of three indicators, shifted one position to the left with respect to the previous note;

the lower limit tone, as well as the lowest note 507 of the scale, are mapped to the leftmost three indicators.

Each of the tones is mapped to an adjustment setting 801–807 for the tone contour of the device. As shown in FIG. 8, the highest-pitched tone contour 501 corresponds to a treble-boosted tone 801, while the lowest-pitched tone contour 507 corresponds to a bass-boosted tone. The center tone 504 corresponds to a flat tone contour 804.

By providing a distinctive display configuration for tone adjustments (three indicators that are "shifted" from left to right), this embodiment of the present invention provides an additional visual cue for distinguishing tone adjustments from volume adjustments.

The above configurations are merely exemplary. One skilled in the art will recognize that other mappings between the visual display and the auditory interface are also possible.

State Diagram

Referring now to FIG. 9, there is shown a state transition diagram for a telephone headset device employing the auditory user interface of the present invention.

In state A, the initial factory state, power has not been applied and button presses are ignored.

In state B1, the device has been properly wired and connected to the user's telephone.

When power is applied to the device, it enters state B (earphone volume mode). In one embodiment, the device performs a power-on self test, as is known in the art. In general, the device "remembers" settings when power is off (state B1).

Mode button 202 cycles through states B, C, and D.

"+" and "−" buttons 203 and 204 operate to change volume and tone settings, as described in detail above. Thus, while in state B, these buttons adjust the earphone volume. In state C, these buttons adjust the microphone volume. In state D, these buttons modify the tone contour.

States B2, C2, and D2 represent typical operation using "+" button 203, "−" button 204, and mode button 202. The leading edge of the button press causes a state transition. As long as the button is depressed, alternative behaviors may occur (not shown). Once the button is released, the operation is complete and the device transitions back to the state shown.

Mute button 208 serves two purposes. When depressed, it acts as a "shift" key, and its indicator illuminates steadily. This permits other operations (not shown). If released without performing a shifted function, the mute state toggles. The indicator of button 208 blinks when mute is active and is extinguished when mute is inactive. Mute button 208 operates in any of states B, C, and D.

In any of states B, C, and D, the user may press headset button 209. This causes the device to switch to handset mode (state E). The user may then use the telephone handset in a conventional manner, and the telephone headset is disabled. Pressing headset button 209 while in state E returns the device to state B (handset disabled, headset enabled, earphone volume mode).

The use of several modes for providing access to control functions provides additional advantages as well. The user can access and manipulate several different control functions by cycling through modes; this allows the device to provide powerful user-configurable capability without requiring an excess of buttons or complexity. Functionality is easily expanded, as new control functions can be added to the design without requiring more buttons. By providing "+" and "−" buttons 203 and 204 for adjusting parameters for a plurality of modes, the user is provided with a consistent and familiar adjustment method. In devices such as a telephone headset adapter, which is often compact in size and offers little space for buttons, the present invention offers a useful operational framework for providing user configurability. In addition, the use of distinctive earcons to denote modes and values, as described above, provides usability benefits in helping the user distinguish among modes.

Also shown in FIG. 9 is a special state F which is used for overriding the microphone volume setting. This state is accessed via a special key sequence (such as pressing three buttons concurrently, or the like), and is used for unusual or emergency situations.

Block Diagram

FIG. 12 is a schematic block diagram showing a headset adapter circuit 600 that could be used to implement the present invention. For example, the adapter circuit 600 may be implemented for headset adapter 100 of FIG. 1. Headset adapter circuit 600 includes telephone interface module 605 which serves as the connection between headset system 610 and the telephone network via host phone 615. There are several possible host phone systems that are capable of interfacing with the headset adapter circuit 600. They can be categorized into tip/ring telephones, PBX systems and ACD systems. Telephone interface module 605 typically performs four functions: handset port wiring configuration, impedance and gain matching, isolation, and switching between headset 610 and telephone handset 620.

Headset interface module (HIM) 625 is the connection between adapter circuit 600 and headset 610. Headset interface module 625 typically performs four functions: provide DC bias for an electret microphone, impedance and gain matching for the headset microphone (not shown), impedance and gain matching for the headset receiver (not shown), and (optionally) frequency shaping for the microphone.

Stage 630 represents an audio signal processor (ASP) and a digital microcontroller in headset adapter circuit 600. Although the ASP and digital microcontroller are shown as a single block in FIG. 12, both components may also be implemented as separate stages or blocks. The control function can also be implemented using analog techniques. The ASP processes host telephone 615 handset port receive signals, in analog form, from telephone interface module 605, and produces the analog signals required to operate the headset transducers through the headset interface module 625. The ASP also processes transmit signals from headset 610 microphone via HIM 625 and produces the analog signal via TIM 605, for driving the telephone line via telephone host 615. The digital microcontroller is coupled to user input/output interface 635 and to the ASP, and may be implemented by, for example, a low cost 8-bit microcontroller. Thus, the digital microcontroller transmits control signals between user input/output interface 535 and the ASP. The user actuates the control elements in user input/output interface 635 to enable various functions such as coupling host telephone 615 to headset 610 or to handset 620, and stage 630 and telephone interface module 605 permit host telephone 615 to be coupled to headset 610 or handset 620. In one embodiment, user input/output interface 635 contains circuitry and/or software for maintaining the current state of adapter 600 as is known in the art, including for example the currently selected mode and the value of any changeable parameters. Such information may be stored, for example, in random-access memory, non-volatile random-access memory, or in some other storage medium.

Transmit channels "Tx" transmit headset microphone signals to host telephone 615 via telephone interface module 605. As also shown in FIG. 12, microphone signals from telephone handset 620 are also transmitted in a transmit channel Tx to host telephone 615 via telephone interface module 605. The dynamic signal processing performed in the transmit channels Tx includes voice expansion on the microphone signal from the headset only. Such voice expansion function reduces ambient noise that is introduced by the user's environment and thus leads to improved telephony sound quality.

Receive channels "Rx" transmit headset earphone signals from host telephone 615 via telephone interface module 605. The dynamic signal processing performed in the receive channels Rx include compression, limiting, and expansion. Typically, only signals to or from telephone interface module 605 are processed for compression and expansion. The compression function provides acoustic limiting at an upper level of loudness limit for the headset user. The expansion function reduces line and background noise by reducing channel gain between words and sentences by the user.

Accessory bus 640 permits control signals to be transmitted to and from an accessory component (not shown). As indicated in FIG. 12, accessory bus 640 is an optional component in the headset adapter circuit 600.

In one embodiment, the auditory user interface of the present invention is implemented as part of user input/output interface 635.

From the above description, it will be apparent that the invention disclosed herein provides a novel and advantageous auditory user interface system and method. The foregoing discussion discloses and describes merely exemplary methods and embodiments of the present invention in connection with an implementation in a telephone headset adapter. In one embodiment, the present invention may be included in a headset adapter such as described in the related application for "Headset Adapter with Detachable Under-the-Phone Accessory Deck." One skilled in the art will recognize, however, that the present invention can be implemented in many other types of devices and in many other contexts, either with or without an accompanying visual interface. Accordingly, the scope of the invention is not limited by the description of the embodiment provided herein, but is only limited by the specific recitations of the claims.

What is claimed is:

1. A method for changing and indicating a state of a device, the method comprising the steps of:
   accepting a user input for changing a state of the device;
   responsive to the user input, changing the state of the device, the changing of the state being at least one of changing a value of a parameter associated with a currently active mode and changing the currently active mode, the device having at least one mode and, for each mode, a parameter and a set of auditory indicators for indicating values of the corresponding parameter, each set of auditory indicators having a distinct auditory characteristic identifying the corresponding mode; and
   outputting an auditory indicator to indicate the state of the device, the output auditory indicator being selected from the set of auditory indicators associated with the currently active mode based on the value of the parameter associated with the currently active mode, the output auditory indicator indicating the currently active mode and the value of the parameter corresponding to the currently active mode.

2. The method of claim 1, wherein changing the state of the device comprises the step of changing the value of the parameter associated with the currently active mode, and wherein the output auditory indicator indicates the modified value of the parameter.

3. The method of claim 1, wherein the step of changing the state of the device comprises the step of changing the currently active mode.

4. The method of claim 1, wherein the output auditory indicator has a pitch representing the value of the parameter of the currently active mode.

5. The method of claim 1, wherein the distinct auditory characteristic of a set of auditory indicators is selected from the group consisting of:
   a distinct musical scale;
   a distinct frequency range;
   a distinct timbre;
   a distinct loudness level;
   a distinct auditory envelope;
   a distinct tone pattern; and
   a distinct tone length.

6. The method of claim 1, wherein a set of auditory indicators belongs to a distinct musical scale selected from the group consisting of:
   a diatonic musical scale; and
   a chromatic musical scale.

7. The method of claim 1, wherein at least one set of auditory indicators further includes an auditory limit indicator, the limit indicator indicating a limit value and having a distinct auditory characteristic identifying a corresponding mode.

8. The method of claim 7, wherein each auditory limit indicator is a two-tone sequence.

9. The method of claim 8, wherein the two-tone sequence comprises a center tone and a limit tone.

10. The method of claim 8, wherein the two-tone sequence comprises tones spaced one-half octave apart.

11. The method of claim 1, wherein at least one set of auditory indicators further includes an auditory center indicator, the center indicator indicating a center value and having a distinct auditory characteristic identifying a corresponding mode.

12. The method of claim 11, wherein each auditory center indicator is a three-tone sequence.

13. The method of claim 1, wherein the device is a headset adapter.

14. The method of claim 1, wherein for at least one mode the parameter is selected from the group consisting of:
   speaker volume;
   headset volume;
   microphone volume; and
   tone contour.

15. The method of claim 1, further comprising the step of:
   displaying a visual indicator indicating the value of the parameter associated with the currently active mode.

16. The method of claim 15, wherein the step of displaying the visual indicator comprises the step of activating a subset of a plurality of visual indicator elements to represent the value of the parameter.

17. The method of claim 16, wherein the activated subset comprises a plurality of adjacent visual indicator elements.

18. The method of claim 16, wherein the activated subset corresponds to the output auditory indicator.

19. A method for changing and indicating a state of a device, the method comprising the steps of:
   accepting a user input specifying a mode of the device, the device having at least one mode and, for each mode, a parameter having a value, a set of auditory indicators for indicating values of the corresponding parameter, and an auditory indicator for indicating mode activation, each set of auditory indicators having a distinct auditory characteristic identifying the corresponding mode;
   outputting the auditory indicator indicating mode activation for the specified mode;
   accepting a user input specifying a value change of the parameter associated with the specified mode;
   responsive to the value of the parameter for the specified mode being at a limit value, outputting an auditory indicator indicating a limit value; and
   responsive to the value of the parameter for the specified mode not being at a limit value, performing the sub-steps of:
     changing the value of the parameter;
     responsive to the changed value being a center value, outputting an auditory indicator indicating a center value; and
   responsive to the changed value not being a center value, outputting one of the auditory indicators selected from the set of auditory indicators for the specified mode, the output auditory indicator indicating the changed value.

20. A headset adapter, comprising:
   an input device, for accepting a user input for changing a state of the device;

a state memory, coupled to the input device, for, responsive to the user input, changing the state of the device by at least one of changing a value of a parameter associated with a currently active mode and changing the currently active mode, the headset adapter having at least one mode and, for each mode, a parameter and a set of auditory indicators for indicating values of the corresponding parameter each set of auditory indicators having a distinct auditory characteristic identifying the corresponding mode; and an output device, coupled to the state memory, for outputting an auditory indicator to indicate the state of the device, the output auditory indicator being selected from a set of auditory indicators associated with the currently active mode based on the value of the parameter associated with the currently active mode, the output auditory indicator indicating the currently active mode and the value of the parameter corresponding to the currently active mode.

21. The headset adapter of claim 20, wherein the state memory changes a value of the parameter associated with the currently active mode, and wherein the output auditory indicator indicates the modified value of the parameter.

22. The headset adapter of claim 20, wherein the state memory changes the currently active mode.

23. The headset adapter of claim 20, wherein the output auditory indicator has a pitch representing the value of a parameter the currently active mode.

24. The headset adapter of claim 20, wherein the distinct auditory characteristic of a set of auditory indicators is selected from the group consisting of:

a distinct musical scale;

a distinct frequency range;

a distinct timbre;

a distinct loudness level;

a distinct auditory envelope;

a distinct tone pattern; and a distinct tone length.

25. The headset adapter of claim 20, wherein a set of auditory indicators belongs to a distinct musical scale selected from the group consisting of:

a diatonic musical scale; and a chromatic musical scale.

26. The headset adapter of claim 20, wherein at least one set of auditory indicators further includes an auditory limit indicator, the limit indicator indicating a limit value and having a distinct auditory characteristic identifying a corresponding mode.

27. The headset adapter of claim 26, wherein each auditory limit indicator is a two-tone sequence.

28. The headset adapter of claim 27, wherein the two-tone sequence comprises a center tone and a limit tone.

29. The headset adapter of claim 27, wherein the two-tone sequence comprises tones spaced one-half octave apart.

30. The headset adapter of claim 20, wherein at least one set of auditory indicators further includes an auditory center indicator, the center indicator indicating a center value and having a distinct auditory characteristic identifying a corresponding mode.

31. The headset adapter of claim 30, wherein each auditory center indicator is a three-tone sequence.

32. The headset adapter of claim 20, wherein for at least one mode the parameter is selected from the group consisting of:

speaker volume;

headset volume;

microphone volume; and tone contour.

33. The headset adapter of claim 20, further comprising:

a visual display, coupled to the state memory, for indicating the value of the parameter corresponding to the currently active mode.

34. The headset adapter of claim 33, wherein the visual display comprises a plurality of visual indicator elements separately activable to represent a value of a parameter.

35. The headset adapter of claim 20, wherein the output device comprises a speaker.

36. A headset adapter, comprising:

input means, for accepting a user input for changing a state of the device;

means, coupled to the input means, for, responsive to the user input, changing the state of the device by at least one of changing a value of a parameter associated with a currently active mode and changing the currently active mode, the headset adapter having at least one mode and, for each mode, a parameter and a set of auditory indicators for indicating values of the corresponding parameter, each set of auditory indicators having a distinct auditory characteristic identifying the corresponding mode; and output means, coupled to the means for changing the state of the device, for outputting an auditory indicator to indicate the state of the device, the output auditory indicator being selected from the set of auditory indicators of the currently active mode based on the value of the parameter associated with the currently active mode, the output auditory indicator indicating the currently active mode and the value of the parameter corresponding to the currently active mode.

37. The headset adapter of claim 36, wherein the means for changing the state of the device changes the value of the parameter associated with the currently active mode, and wherein the output means indicates the modified value of the parameter.

38. The headset adapter of claim 36, wherein the means for changing the state of the device changes the currently active mode.

39. A collection of auditory indicators representing mode and value information for a device having a plurality of modes, each mode corresponding to a parameter of the device having a value, comprising:

a plurality of auditory mode indicators, each auditory mode indicator indicating a mode; and for each mode, a set of auditory value indicators, each auditory value indicator indicating a value for a parameter associated with a mode, each set of auditory value indicators having a distinct auditory characteristic identifying the corresponding mode.

40. The collection of auditory indicators of claim 39, wherein each auditory value indicator has a pitch representing a value for a parameter associated with a mode.

41. The collection of auditory indicators of claim 39, wherein the distinct auditory characteristic of a set of auditory indicators is selected from the group consisting of:

a distinct musical scale;

a distinct frequency range;

a distinct timbre;

a distinct loudness level;

a distinct auditory envelope;

a distinct tone pattern; and a distinct tone length.

42. The collection of auditory indicators of claim 39, wherein a set of auditory indicators belongs to a distinct musical scale selected from the group consisting of:

a diatonic musical scale; and a chromatic musical scale.

43. The collection of auditory indicators of claim 39, wherein at least one set of auditory indicators further includes an auditory limit indicator, the limit indicator indicating a limit value and having a distinct auditory characteristic identifying a corresponding mode.

44. The collection of auditory indicators of claim 39, wherein each auditory limit indicator is a two-tone sequence.

45. The collection of auditory indicators of claim 44, wherein the two-tone sequence comprises a center tone and a limit tone.

46. The collection of auditory indicators of claim 44, wherein the two tone sequence comprises tones spaced one-half octave apart.

47. The collection of auditory indicators of claim 39, wherein at least one set of auditory indicators further includes an auditory center indicator, the center indicator indicating a center value and having a distinct auditory characteristic identifying a corresponding mode.

48. The collection of auditory indicators of claim 47, wherein each auditory center indicator is a three-tone sequence.

49. The collection of auditory indicators of claim 39, wherein for at least one mode the parameter is selected from the group consisting of:

speaker volume;

headset volume;

microphone volume; and tone contour.

\* \* \* \* \*